Figure 1:
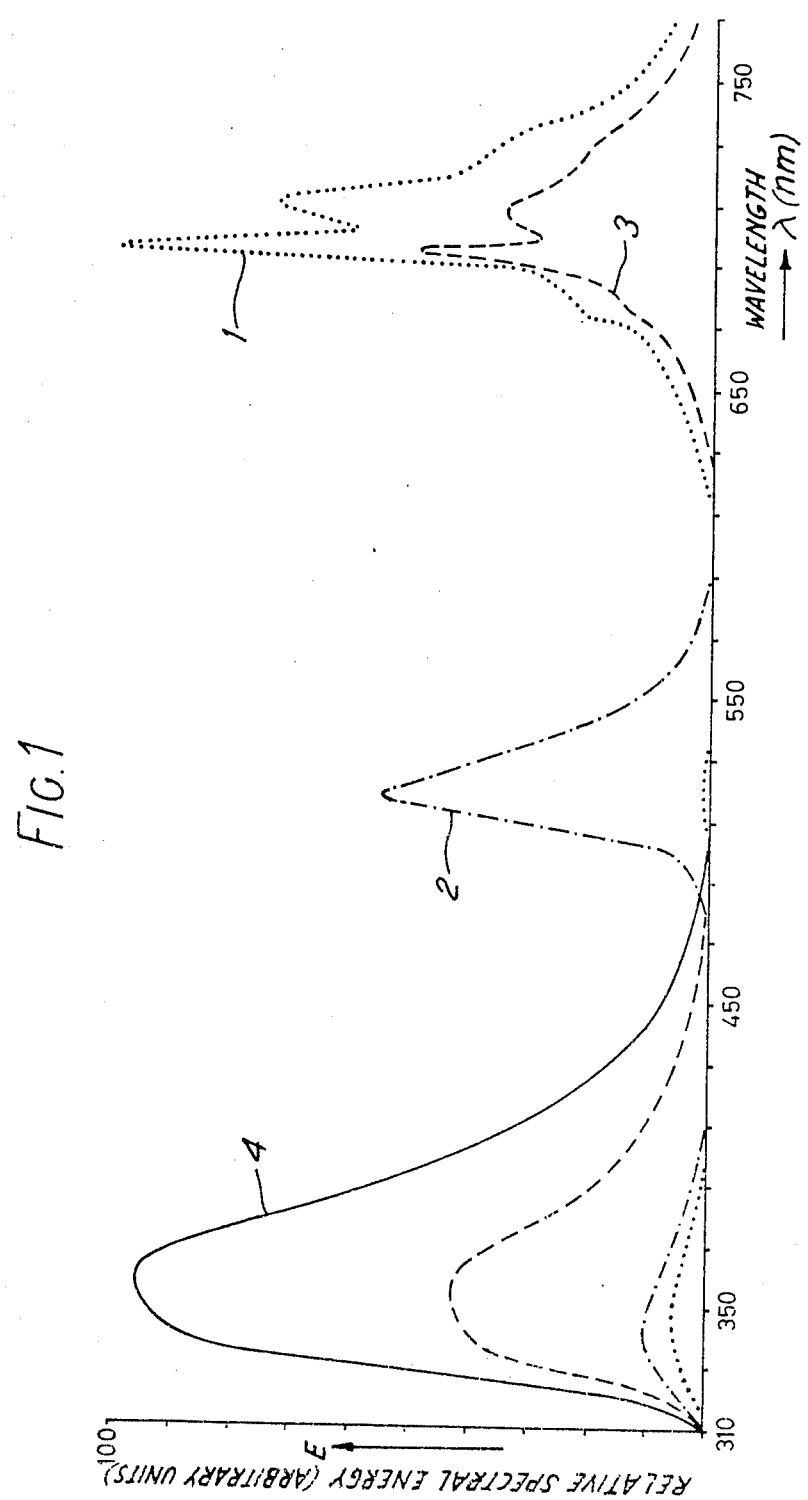

United States Patent [19]

Catherall

[11] Patent Number: 4,719,387
[45] Date of Patent: Jan. 12, 1988

[54] INFRA-RED PHOSPHORS AND FLUORESCENT LAMP CONTAINING THE SAME

[75] Inventor: Colin L. R. Catherall, Enfield, England

[73] Assignee: Thorn EMI plc, London, England

[21] Appl. No.: 929,792

[22] Filed: Nov. 13, 1986

[30] Foreign Application Priority Data

Nov. 13, 1985 [GB] United Kingdom ............... 8527992

[51] Int. Cl.$^4$ ................. H01J 61/44; C09K 11/463
[52] U.S. Cl. ......................... 313/486; 252/301.4 R; 252/301.6 R
[58] Field of Search ............... 252/301.4 R, 301.6 R; 313/486

[56] References Cited

U.S. PATENT DOCUMENTS

| | | | |
|---|---|---|---|
| 3,597,365 | 8/1971 | Ward | 252/301.4 R |
| 3,693,006 | 9/1972 | Chenot | 252/301.4 R |
| 4,003,845 | 1/1977 | van den Boom et al. | 252/301.4 R |
| 4,071,465 | 1/1978 | Vodoklys | 252/301.4 R |
| 4,524,300 | 6/1985 | Rutten et al. | 252/301.4 R |

FOREIGN PATENT DOCUMENTS 49-123992 11/1974 Japan ............... 252/301.4 R
2039517 8/1980 United Kingdom .

Primary Examiner—Jack Cooper
Attorney, Agent, or Firm—Fleit, Jacobson, Cohn & Price

[57] ABSTRACT

An infra-red emissive phosphor consists of chromium activated cerium manganese aluminate having a hexagonal crystal structure and represented by the general formula:

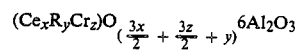

$$(Ce_xR_yCr_z)O_{(\frac{3x}{2} + \frac{3z}{2} + y)} \cdot 6Al_2O_3$$

where x is from 0.3 to 3.0, y is from 0.01 to 2.0, z is from 0.001 to 0.3 and R is manganese, in which up to 95 atomic percent of the manganese may be replaced by an equivalent amount of zinc or magnesium or both.

11 Claims, 2 Drawing Figures

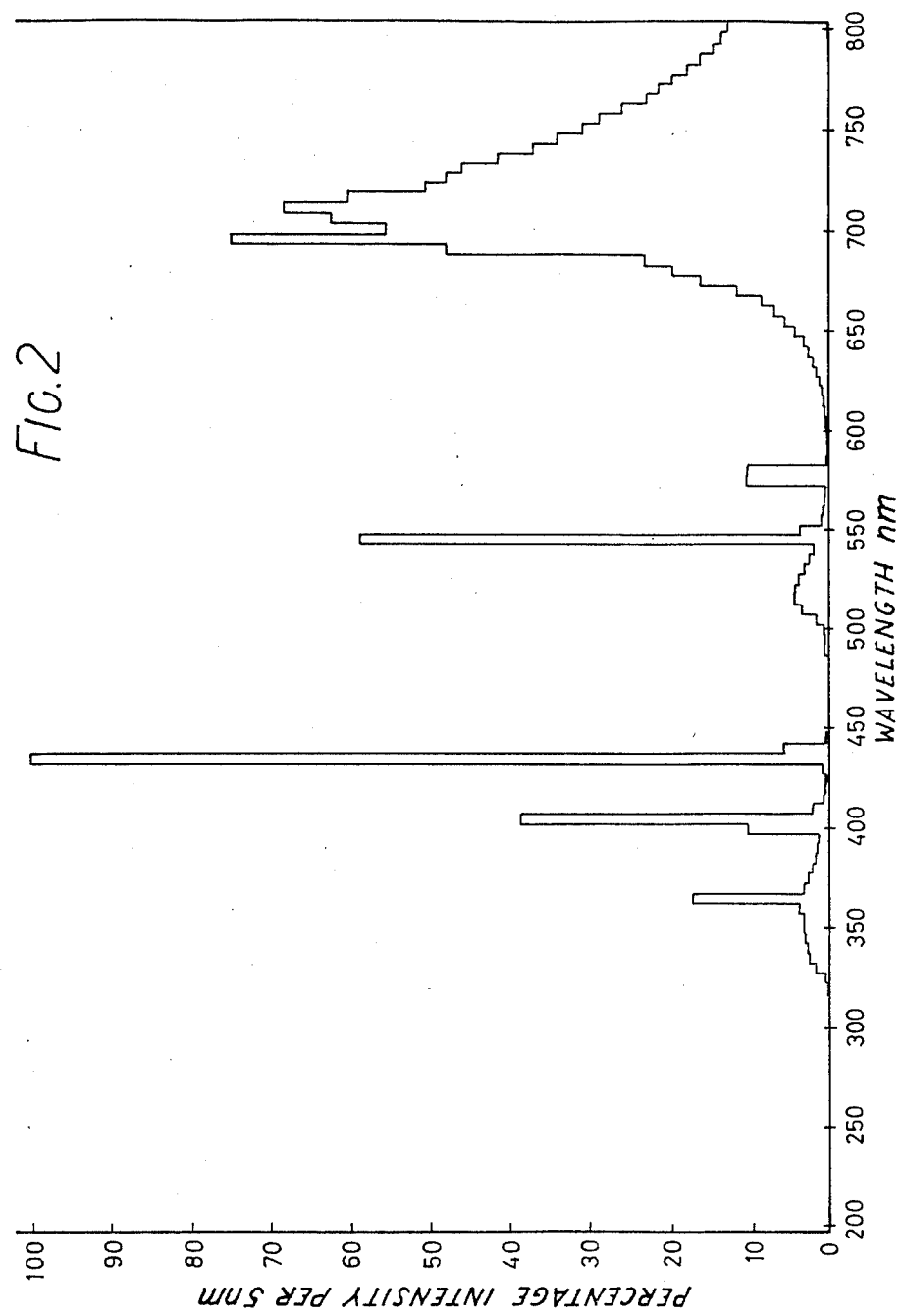

INFRA-RED PHOSPHORS AND FLUORESCENT LAMP CONTAINING THE SAME

This invention relates to phosphors which emit mainly in the region of the electromagnetic spectrum between about 650 and 800 nm. This region incorporates the boundary between the far red end of the visible spectrum and the invisible infra-red radiations. For the sake of convenience, emissions in this spectral range will be referred to as infra-red.

Materials which emit in the infra-red are of growing importance and fluorescent lamps which emit predominantly in the infra-red are used in a number of technical processes.

A well-known phosphor which emits in the infra-red is lithium aluminate activated by iron ($LiAlO_2$:Fe), but this has serious disadvantages when attempts are made to use it in suspensions to internally coat the glass tubing used to make fluorescent lamps. Suspensions of the phosphor rapidly deteriorate and, during the manufacture of the fluorescent tube, the phosphor tends to cause embrittlement of the glass. Also, lamps, when eventually made with this phosphor, have a poor maintenance of light output with operating time.

Trivalent chromium ions can emit infra-red luminescence when incorporated as an activator in certain phosphor lattices and when excited by an appropriate means such as electromagnetic radiation in a suitable wavelength range, and GB No. 2 039 517B discloses an infra-red emissive phosphor which requires gadolinium.

In general, the trivalent chromium ion, when it is incorporated in a lattice as the sole activator, is not efficiently excited by ultra-violet radiation at 254 nm. Such lattices, containing chromium ions, tend to be unsuitable for use in low pressure mercury discharge lamps to convert the radiation of approximately 254 nm in the discharge to infra-red radiation.

It is an object of the present invention to provide an infra-red emitting phosphor which alleviates at least some of the problems described hereinbefore.

According to the invention there is provided a phosphor consisting of chromium activated cerium manganese aluminate having a hexagonal crystal structure and represented by the general formula:

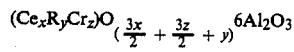

where
- x is from 0.3 to 3.0,
- y is from 0.01 to 2.0,
- z is from 0.001 to 0.3 and
- R is manganese, in which up to 95 atomic percent of the manganese may be replaced by an equivalent amount of zinc or magnesium or both.

For the purposes of this specification, a "chromium activated cerium manganese aluminate" (as in the preceding paragraph) includes one in which small changes, such as substitution of some of the manganese for zinc or magnesium or both, or dilution of the cerium or aluminium with other trivalent metals, are made.

The inventor has found that in a phosphor according to the invention cerium and manganese ions act as sensitizers to absorb the ultra-violet radiation and convert it to energies which are more effectively absorbed by the chromium ions and converted to infra-red radiation.

In the general formula given above, y may desirably be in the range from 0.01 to 1.0 and z may desirably be in the range from 0.001 to 0.2.

In a beneficial embodiment of the invention, the phosphor may be represented by:

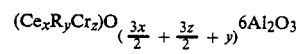

where
- x is from 0.3 to 3.0,
- y is from 0.01 to 1.0,
- z is from 0.001 to 0.2 and
- R is manganese, in which up to 95 atomic percent of the manganese may be replaced by an equivalent amount of zinc or magnesium or both.

The phosphor may be prepared by heating mixtures of oxides, or compounds which yield the oxides, of cerium, manganese, chromium and aluminium and optionally of zinc or magnesium or both.

x is preferably from 0.4 to 1.5, y is preferably from 0.1 to 1.0 and desirably from 0.1 to 0.6 and z is preferably from 0.01 to 0.1.

The invention also provides a fluorescent lamp comprising an envelope, the internal surface of which is coated with a phosphor according to the invention.

The component materials of the phosphor should be of the high purity usually associated with the preparation of inorganic phosphors.

The components are intimately mixed together and then heated to a high temperature of at least 1350° C. and preferably between 1400° C. and 1700° C. in air or an inert atmosphere. When cool, the product is ground and refired at a lower temperature between 800° C. and 1200° C. and preferably 1000° C. to 1100° C. in a reducing atmosphere of, for example, a 90:10 ratio of nitrogen to hydrogen by volume. When cool, the product is ground and sieved.

Other modifications to this general process will be obvious to those skilled in the art.

The phosphors of the present invention are chromium activated cerium manganese aluminates of a hexagonal crystal structure. When excited by short wavelength U.V., they emit in the far-red and near infra-red and are of value in the manufacture of infra-red emitting fluorescent lamps which are of growing importance in such areas as optical processes, infra-red photography, the sorting of agricultural produce and plant growth.

In order that the invention may be clearly understood and readily carried into effect, it will be described by way of example, with reference to the accompanying drawings, of which:

FIG. 1 shows emission spectra of samples both according to and outside the scope of the invention, and FIG. 2 shows the spectral energy distribution curve of a fluorescent lamp incorporating a phosphor according to the invention.

The invention is illustrated by, but in no way limited to, the following Examples:

EXAMPLE 1

A mixture of $CeO_2$ (26.5 g), $MnCO_3$ (11.5 g), $Al_2O_3$ (122.4 g) and $Cr_2O_3$ (0.31 g) was intimately ground and heated in an alumina crucible for 4 hours at 1500° C. When cool, the product was crushed and reheated to 1100° C. in a reducing atmosphere of 10% hydrogen in nitrogen for ½ hour. After cooling in the reducing atmosphere, the product was ground and sieved to yield a phosphor in which x=0.77, y=0.5, z=0.02 and R is wholly manganese. When irradiated by 254 nm radiation, the product fluoresced in the infra-red with peak emission at 695 nm (characteristic of $Cr^{3+}$ emission). The emission spectrum of this sample is shown in FIG. 1 (Curve 1).

Also shown in FIG. 1 for the purposes of comparison are the emission spectra after 254 nm excitation of samples corresponding to the compositions x=0.77, y=0.5, z=0 and R is manganese (Curve 2), x=0.77, y=0.5, z=0.02 and R is magnesium (Curve 3), and x=0.77, y=0.5, z=0 and R is magnesium (Curve 4). These materials, whose compositions are outside the scope of this invention, were prepared by grinding together suitable reactants and treating in substantially the same manner as the phosphor whose emission is represented by Curve 1. Curve 4 shows the characteristic emission of trivalent cerium when it is present as the only activator in the lattice. Curve 3 illustrates the extent of direct energy transfer between the cerium and chromium when the latter is also incorporated into the lattice at z=0.02. Curve 2 illustrates the transfer of cerium to manganese alone. A comparison of Curves 1 and 3 clearly demonstrates the beneficial effect of incorporating manganese as an intermediate in the energy transfer between cerium and chromium.

The spectral energy distribution of a 600 mm long 18 W fluorescent lamp coated with phosphor prepared as in Example 1 and according to the invention is shown in FIG. 2. When compared with a typical lithium aluminate Fe phosphor although the initial relative infra-red energy outputs were both about the same, the output of our new phosphor only decreased to 96% after 100 hours of operation and only to 92% after 500 hours of operation, whereas the corresponding values for the lithium aluminate phosphor were 80% and 70% respectively.

EXAMPLE 2

A mixture of $Ce(NO_3)_3 6H_2O$ (67.1 g), $MnCO_3$ (11.5 g) $Al_2O_3$ (122.4 g) and $Cr_2O_3$ (0.31 g) was intimately ground and heated in the same manner as described in Example 1. When cool, the product was crushed and sieved and showed a similar emission and composition to the phosphor of Example 1, whose emission is shown in Curve 1 of FIG. 1.

In the above Examples, x is 0.77, y is 0.5, and z is 0.02. The cerium, manganese and chromium contained in the phosphor are preferably in the atomic ratio of 0.77:0.5:0.02.

EXAMPLE 3

A mixture of $CeO_2$ (26.5 g), $MnCO_3$ (9.2 g), ZnO (1.6 g), $Al_2O_3$ (122.4 g) and $Cr_2O_3$ (0.31 g) was intimately ground and heated as in Example 1. When cool, the product was crushed and sieved and was found to have a similar emission to the phosphor of Example 1, whose emission is shown in Curve 1 of FIG. 1.

In this Example, the prepared phosphor contains cerium, manganese, zinc and chromium in the atomic ratio 0.77:0.4:0.1:0.02.

EXAMPLE 4

A mixture of $CeO_2$ (26.5 g), $MnCO_3$ (2.3 g), ZnO (9.6 g), $Al_2O_3$ (122.4 g) and $Cr_2O_3$ (0.31 g) was treated as in the preceding Examples. The resultant phosphor was found to have a similar emission to the phosphor of Example 1, whose emission is shown in Curve 1 of FIG. 1.

In this Example, the prepared phosphor contains cerium, manganese, zinc and chromium in the atomic ratio 0.77:0.1:0.59:0.02.

EXAMPLE 5

A mixture of $CeO_2$ (26.5 g), $MnCO_3$ (2.3 g), MgO (4.8 g), $Al_2O_3$ (122.4 g) and $Cr_2O_3$ (0.31 g) was treated as in the preceding Examples and the resultant phosphor was found to have a similar emission to the phosphor of Example 1, whose emission is shown in Curve 1 of FIG. 1.

In this Example, the prepared phosphor contains cerium manganese, magnesium and chromium in the atomic ratio 0.77:0.1:0.59:0.02.

According to usual practice in the lamp phosphor field, the phosphor materials can be diluted by replacing up to about 10% by weight of the cerium or aluminium used in preparing the phosphors according to the present invention by equivalent amounts of other trivalent metals such as yttrium, lanthanum, gadolinium or gallium, though it is preferable not to include gadolinium in the phosphor. (Yttrium, lanthanum and gadolinium would go into Ce sites, whereas gallium would go into an aluminium site.) When cerium and aluminium are recited in the claims, it is intended that this wording also embraces such diluted materials. Such dilution does not cause an unacceptable loss in brightness of the phosphor.

I claim:

1. A phosphor emitting in the region of the electromagnetic spectrum between 650 and 800 nm when excited by 254 nm radiation consisting of chromium activated cerium manganese aluminate having a hexagonal crystal structure and represented by the general formula:

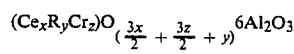

where
x is from 0.3 to 3.0,
y is from 0.01 to 2.0,
z is from 0.001 to 0.3 and
R is manganese, in which up to 95 atomic percent of the manganese is replaceable by an equivalent amount of zinc or magnesium or both, said phosphor emitting a greater luminance in said region than the same phosphor absent manganese when excited by 254 nm radiation.

2. A phosphor according to claim 1, in which y is from 0.01 to 1.0.

3. A phosphor according to claim 2 in which y is between 0.1 and 1.0.

4. A phosphor according to claim 3 in which y is between 0.1 and 0.6.

5. A phosphor according to claim 4 in which y is 0.5.

6. A phosphor according to claim 1 in which z is from 0.001 to 0.2.

7. A phosphor according to claim 6 in which z is between 0.01 and 0.1.

8. A phosphor according to claim 7 in which z is 0.02.

9. A phosphor according to claim 1 in which x is between 0.4 and 1.5.

10. A phosphor according to claim 9 in which x is 0.77.

11. A fluorescent lamp comprising an envelope, the internal surface of which is coated with a phosphor according to any one of the claims 1 to 10.

* * * * *